Patented July 20, 1954

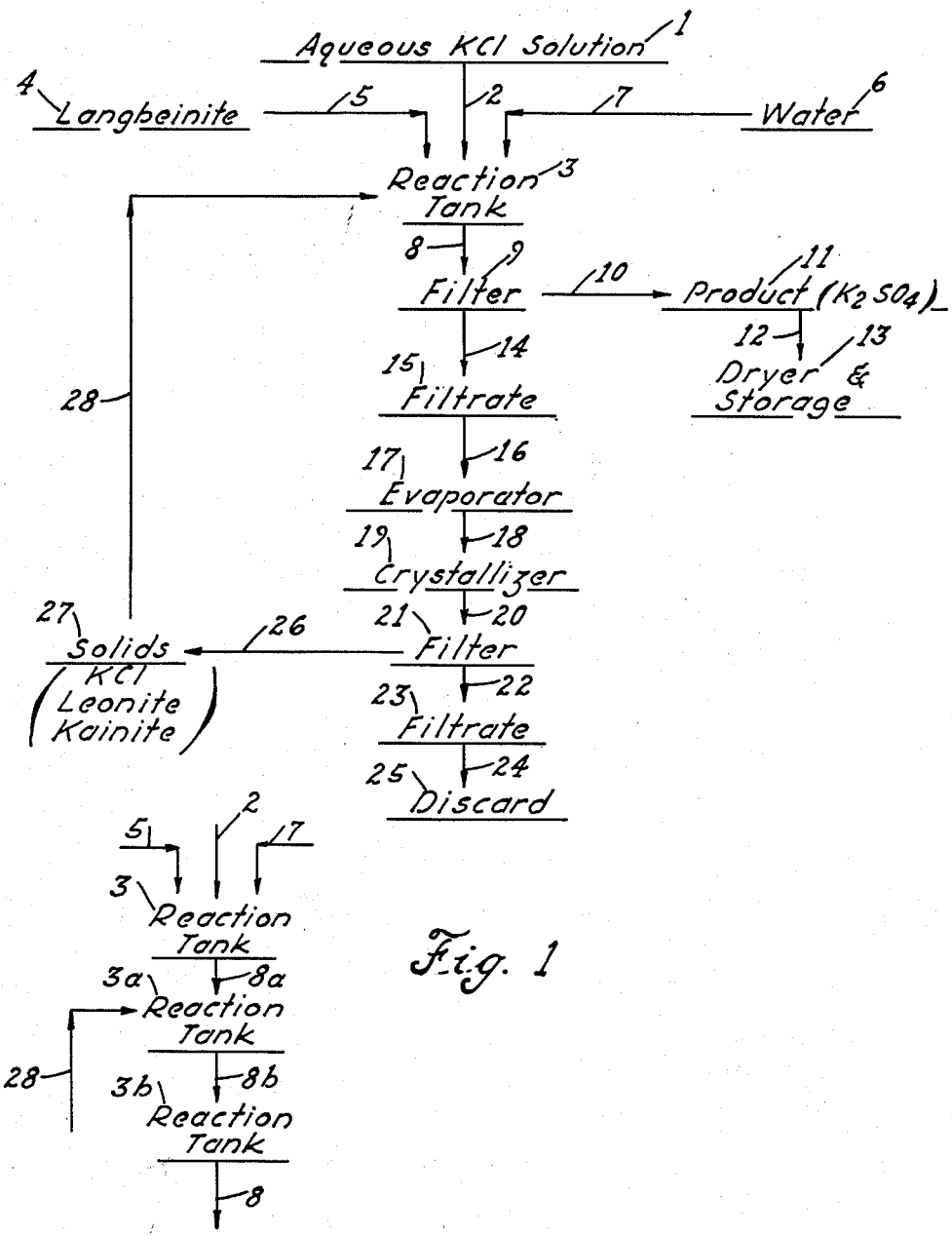

2,684,285

UNITED STATES PATENT OFFICE 2,684,285

SIMPLIFIED BASE EXCHANGE PROCESS

William B. Dancy, Carlsbad, N. Mex., assignor to International Minerals & Chemical Corporation, a corporation of New York Application June 7, 1950, Serial No. 166,715

12 Claims. (Cl. 23—121)

This application is a continuation-in-part of application Serial No. 768,717, filed August 14, 1947, now abandoned.

The present invention relates to the base exchange or metathesis of the magnesium content of langbeinite with the potassium content of potassium chloride in order to produce potassium sulfate of relatively high purity. More particularly, the present process involves the direct reaction of langbeinite with potassium chloride in aqueous medium.

Langbeinite ore as mined and refined in the Carlsbad area of New Mexico may be represented by the formula $K_2SO_4.2MgSO_4$ and contains roughly about 4.0% by weight of sodium chloride as an impurity. Commercial grades of potassium chloride, produced in the same area and known to the fertilizer industry as 60% muriate of potash, contain as their principal impurity about 3.0% by weight of sodium chloride.

In the past, processes have been developed involving the production of potassium sulfate over and above the quantities naturally present in langbeinite by reacting an aqueous solution or slurry of potassium chloride substantially free from sodium chloride with leonite and/or schoenite having the formulae respectively $K_2SO_4.MgSO_4.H_2O$ and $K_2SO_4.MgSO_4.6H_2O$ to produce potassium sulfate and a potassium-containing mother liquor. The leonite and schoenite are produced by reacting langbeinite substantially free of sodium chloride with the mother liquor separated from the potassium sulfate crystals. In this manner a portion of the potassium content of the high potassium-containing mother liquor is recovered by the production of the solid salts leonite and schoenite which can be used in the reaction step with potassium chloride to produce potassium sulfate. As practiced in the past, these processes have necessarily involved the use of reactants which are substantially free of sodium chloride, but it is necessary to follow a complicated system for handling the intermediate solids and liquors as outlined in processes such as those disclosed by U. S. Patent 2,295,257, September 8, 1942, and issued to Butt. In addition, concentrations of sodium chloride such as are present as impurities in commercially available langbeinite and 60% muriate of potash seriously reduce the overall recoveries when practicing the processes heretofore known. It has been found in practice that actual recoveries of the order of 65% to 70% of the $K_2O$ values of the raw materials are about as high as can be expected by following the processes heretofore practiced.

It is an object of the present invention to increase the overall actual recoveries of the potassium values in langbeinite and potassium chloride raw materials, said raw materials containing a small yet significant amount of sodium chloride.

It is a further object of the invention to afford an improved but simplified process of base exchange or metathesis which readily lends itself to a continuous operation for the production of potassium sulfate of excellent purity.

It is a further object of the invention to lower the operating cost and the maintenance cost of producing potassium sulfate of relatively high grade by eliminating the necessity for excessive transporting and handling of liquids and solids.

It is a still further object of the invention to eliminate or substantially eliminate the final production of the intermediate salts leonite and/or schoenite in the production of potassium sulfate from langbeinite and potassium chloride.

It is another object of the invention to provide a direct one step reaction process of producing potassium sulfate by directly reacting langbeinite and potassium chloride, thereby eliminating the necessity for separating, in a plurality of steps, solids from liquors.

It is a still further and important object of the invention to efficiently produce potassium sulfate and thus obtain higher recovery of $K_2O$ values although building up concentrations of sodium salts, such as sodium chloride, in the system heretofore considered too great to operably recover potassium sulfate commercially.

It is a still further and important object of the present invention to produce sizeable particles of potassium sulfate in the form of pellets of readily saleable character and of excellent packaging and shipping properties.

Other objects of the invention will be apparent upon a fuller understanding of the invention as hereinafter set forth.

According to the process of the present invention, an aqueous reaction mixture containing langbeinite and potassium chloride, both reactants being of commercial grade as previously described, or pure if desired, is allowed to react at from ordinary or atmospheric temperatures up to about 60° C. for a period of time sufficient to permit the reaction to proceed substantially to equilibrium. This reaction, if nothing more is added thereto, will produce a final reaction mixture from which potassium sulfate may be crystallized. The mother liquor from such a reaction will contain mixed salts as hereinafter described, as well as magnesium chloride and sodium chloride. However, in practicing the present invention there is also present in the reaction mixture mixed salts produced and isolated at a later point in the process, all of which is in full hereinafter described. Depending upon the temperatures employed, the time required will usually vary between about one and about four hours, although shorter times and longer times than this may be used if it is necessary to use the same in order to obtain substantial equilibrium in the reaction mixture. After equilibrium has been attained, or substantially attained, the crystals of potassium sulfate product are separated from the mother liquor and, if desired, washed and dried by conventional methods. As hereinafter fully pointed out, these crystals, or a portion thereof, usually the finely sized crystals, may be returned to the reaction zone for further processing and for further crystal buildup. A mother liquor from the potassium sulfate crystals is heated and evaporated to a sufficient extent so that when cooled to atmospheric temperatures, essentially the solution is almost saturated with respect to sodium chloride. In other words, the degree of evaporation is such that upon cooling the solution or concentrate to atmospheric temperature, the liquor will have been concentrated just short of the point at which sodium chloride crystals would be formed. As is hereinafter pointed out, other crystals do form but the sodium chloride for the most part remains in solution. The temperature of the evaporation step is preferably lower than the atmospheric boiling temperature of the mother liquor. This may be accomplished by using vacuum or the partial pressure effect of heated gases passing through the mother liquor. The slurry is cooled, and the solids therein are separated from the liquor by conventional methods such as centrifuging or filtering, and the mixed crystals are then introduced into the reaction mixture.

From the standpoint of the instant process, the liquor containing the undesirable constituents dissolved therein, including sodium chloride, is discarded or treated separately to recover its valuable constituents. The solids separated from the evaporated potassium sulfate mother liquor are the mixed salts previously referred to and comprise essentially potassium chloride with some incidental small amounts of leonite and kainite ($KCl.MgSO_4.3H_2O$). Ordinarily this recycled mixture of mixed salts averages about 75% by weight of potassium chloride with the remainder for the most part being magnesium sulfate and potassium sulfate; the latter salt forming a double salt with part of the magnesium sulfate, with the remainder of the magnesium sulfate forming a double salt with some of the potassium chloride of the mixture. The mixed salts may vary considerably as to potassium chloride content depending on reaction conditions but economically a 75% potassium chloride mixture is generally maintained. At least an aliquot portion of these mixed salts is introduced into the reaction mixture. In order to obtain optimum production of potassium sulfate per unit of raw materials processed, it is generally desirable to recycle substantially all of the mixed salts to the reaction mixture, although it is to be understood that the invention is not limited to this procedure. It is only necessary that a portion of these salts be so introduced into the reaction mixture in order to accomplish the advantages of the invention.

The reaction can be carried out either batchwise or continuously in a single reactor or in a reaction zone comprising two or more reactors connected in series. When the reaction is carried out in a series of reactors, the mixed salts are recycled to the first reactor or preferably to one of the reactors intermediate in the series. For example, when the reaction zone comprises four reactors in series the mixed salts are recycled either to the second or to the third reactor in the series. In a preferred embodiment of the instant novel process the reaction zone comprises four reactors arranged in series, and the mixed salts are recycled to the second reactor in the series.

Reaction efficiency is increased by adding the mixed salts to an intermediate reactor in the series rather than to the first reactor. For any given feed rate of the reactants, the recycling of the mixed salts to the second reactor instead of to the first results in the reaction of a larger amount of langbeinite in any given time period, results in a higher grade product and results in the formation of larger potassium sulfate crystals.

The rate of the reaction of the langbeinite is dependent upon a number of variables, one of which is the magnesium concentration in the reaction mixture. When the magnesium concentration in the reaction mixture is decreased, the quantity of langbeinite which reacts is increased. About 20% of the magnesium contained in the reaction mixture is introduced by the mixed salts and by adhering reject liquor. These salts of magnesium are readily soluble and increase the magnesium concentration in the reactor to which they are added. When the point of addition of the mixed salts is the second reactor the magnesium concentration is low in the first reactor, thus increasing the quantity of langbeinite which will react in the first reactor. When the salts are recycled to the second reactor a larger amount of langbeinite feed can be reacted in any given period of time, and the amount of potassium sulfate produced is increased. When the salts are recycled to the second reactor, and the rate at which the langbeinite feed is introduced into the reaction zone is the same as when the salts are recycled to the first reactor, a better grade of potassium sulfate product is obtained. Larger crystals of potassium sulfate are also produced when the mixed salts are added to the second reactor instead of the first.

The mixed salts are produced in readily separable form if after evaporation or concentration the resultant slurry at between about 95° to about 100° C. is immediately cooled to an intermediate temperature between about 50° to about 60° C. The solution is then cooled to atmospheric temperature while maintaining equilibrium conditions as nearly as possible in order to have a maximum crystal growth. The quicker the evaporated potassium sulfate mother liquor is cooled as an intermediate step the better and more easily filtered the mixed salts become, since a slow cooling of the solution at that stage would produce undesirable intermediate double salt crystals which have a deleterious effect upon the overall process and which are also difficult to filter and recover. Also such crystals at this stage would have a strong tendency to hold up the ultimate reject liquor, and if returned with the crystals to the system would lower the overall recovery of the desired product. A quick cooling of the potassium sulfate mother liquor may be satisfactorily and preferably accomplished through the use of vacuum type equipment since this affords a faster cooling than ordinary open or pressure type equipment. The latter type of equipment may be used, but generally speaking the rate of cooling is much slower and there is more danger of forming the undesired intermediate double salts than in the case of vacuum type coolers.

In carrying out the process of the present invention, no special type of equipment is necessary nor is it necessary to employ corrosion resistant materials in the lines and various pieces of equipment, except that generally speaking the evaporator for potassium sulfate mother liquor and its accessory lines and pumps should be corrosion resistant to the liquors under the conditions obtaining. The evaporator is generally heated to a temperature of between about 70° and about 100° C., depending upon the pressure or partial pressure conditions obtaining. The liquor generally has been evaporated sufficiently when water equivalent to between about 37% and about 40% by weight of the liquor has been removed, after the evaporated liquor has been cooled to atmospheric temperature. Under the conditions generally maintained in the reaction zone when employing evaporator temperature conditions ranging between about 70° and about 100° C. the desired degree of concentration of potassium sulfate mother liquor is accomplished in from between about ½ hour and about 4 hours.

The reaction chambers may be manufactured of ordinary sheet steel and are generally provided with either internal or external heating and cooling means as well as with internal agitation means, such as the turbine impeller types, in order to maintain substantially uniform reacting suspension. The reactors may be provided with jackets and/or internally suspended coils for the introduction of heating and/or cooling liquids in order to maintain the desired reaction temperatures such as heretofore specified, ranging between about 15° and 60° C. The internal agitation means may be operated at various speeds, depending upon the results desired. If thorough slurry mixing is desired without regard to the ultimate particle size of the final potassium sulfate product, a high rate of rotation of the agitation means is employed. If, on the other hand, a large particle size of potassium sulfate is desired, one method of accomplishing this is to rotate the impeller at a lower rate of speed.

As stated in the preceding paragraph, particle size can be varied, depending upon the speed of agitation of the mixture in the reaction zone. It has been found that simultaneous with a relatively slow agitation of the reaction mixture and with the precipitation or crystallization of potassium sulfate, a relatively smooth potassium sulfate pellet which packages and ships advantageously can be produced. The ultimate size of these particles depends upon the length of time that they remain in the reaction chamber or chambers and upon the rate of agitation of the reaction medium. Also, and preferably, these pellets of potassium sulfate, and which in that form constitute one of the preferred products of the reaction, may be produced efficiently by subjecting the reacting slurry to a classifying operation to separate the finer particles from the coarser or larger sizes, while recycling the finer particles of potassium sulfate to the reaction zone to provide additional time for crystal build-up. Such a process is possible only by means of the particular reactants and reaction conditions specified wherein the rate of crystallization of potassium sulfate is wholly controlled by the rate of solution of langbeinite, which rate is sufficiently low to minimize the formation of the new nuclei of potassium sulfate crystals. Thus it is possible to absorb substantally all of the newly formed potassium sulfate on existing crystals of potassium sulfate within the reaction slurry because under the reaction conditions obtaining, the rate of crystallization of new amounts of potassium sulfate is sufficiently slow and the capability of build-up of existing crystals or particles of potassium sulfate is sufficiently great to permit only a relatively few new nuclei of potassium sulfate crystals to be formed, with the bulk of the newly crystallizing potassium sulfate becoming attached to the existing crystals. In prior processes, because of the fact that the reactions produce sizeable quantities of readily soluble intermediate sulfate double salts which are, in turn, quickly converted into potassium sulfate, the rate of crystallization of potassium sulfate is so rapid that only finely crystallized potassium sulfate can be produced and there is no opportunity for the build-up and formation of relatively large potassium sulfate crystals.

For a more complete understanding of the instant novel process, reference may be had to Figure 1 which is a flow sheet of the instant novel process.

An aqueous solution of potassium chloride, for example, 60% muriate of potash solution 1, is allowed to enter reaction tank 3 by means of line 2. Water 6 enters the reaction tank 3 by means of line 7 and langbeinite 4 is conveyed to the same by line 5. The mixture is agitated and allowed to react at about 60° C. for a period of time sufficient to allow the reaction to reach equilibrium. Thereafter the reacted mixture is transferred to filter 9 by means of line 8. The solid potassium sulfate product 11 is removed from filter 9 by means of line 10. The solid potassium sulfate product 11 is conveyed to dryer and storage 13 by line 12.

The filtrate 15 is transferred from filter 9 by line 14 and is conveyed to evaporator 17 by means of line 16. At this point the filtrate 15 is carefully evaporated to a point just short of the crystallization of sodium chloride and/or magnesium chloride when the liquid is at room temperature. As previously stated, the evaporation is preferably carried out below the atmospheric boiling point of the mother liquor.

The concentrated mother liquor is then transferred by line 18 to crystallizer 19 where it is quickly cooled to about 55° C. The resultant crystalline mixture is conveyed to filter 21, by means of line 20, where the solids 27, comprising essentially potassium chloride, kainite and leonite, are separated and removed by line 26. The filtrate 23 is removed by line 22 and transferred to discard 25 by line 24. The solids 27 are returned by line 28 to reaction tank 3 for further use in the reaction, as previously described.

Reaction tank 3 in Figure 1 may be replaced by a reaction zone comprising two or more reactors connected in series. The mixed salts are, in such case, recycled to a reactor intermediate in the series.

Figure 2 shows a series of three reactors, 3, 3a, and 3b. The aqueous potassium chloride solution enters reaction tank 3 by means of line 2. Water enters the reaction tank 3 by means of line 7 and langbeinite is conveyed to the same by line 5 as in Figure 1. From tank 3 the solution is conveyed to tank 3a, then to tank 3b, by means of lines 8a and 8b respectively. From 3b the reacted mixture is conducted by means of line 8 to the remaining steps of the process as outlined in Figure 1. The mixed salts are returned by line 28 to intermediate tank 3a for use in the reaction as previously described with reference to Figure 1.

The following examples are presented in order to afford illustrations of both batch and continuous processes of practicing the present invention, but it is to be distinctly understood that the following examples are illustrative only, and that there is no intention to limit the invention thereto.

EXAMPLE 1

The following batch operation was carried out. Into a jacketed reactor equipped with a mechanical agitator there was added approximately 1,335 pounds of a saturated potassium chloride solution, the potassium chloride of which was the commercially available 60% muriate of potash which contains small amounts of sodium chloride as an impurity. In addition, about 429 pounds of ordinary tap water of average hardness was placed in the reaction chamber and the potassium chloride and water mixture, while being maintained at a temperature of about 30° C., over a one hour period had added thereto about 510 pounds of comminuted langbeinite (above 90% through 200 mesh), which also contained a small quantity of sodium chloride as an impurity. In addition, there was mixed into the reaction mixture about 340 pounds of mixed salts obtained from a previous batch operation involving the same reactants and the same procedure. The mixture was agitated for an additional two hours at about 45° C. with the reacted mixture then being subjected to filtration to separate potassium sulfate crystals. The mother liquor was then subjected to evaporation in an Ozark type evaporator at a temperature of approximately 97° C. for a sufficient length of time to reduce the weight of the original mother liquor finally by from about 37% to 40%. Not all of the evaporation need be and in fact was not carried out in the evaporation step since a subsequent vacuum crystallization step accounted for approximately 5% to 6% by weight of evaporation of the original mother liquor. By reducing the weight of the mother liquor to the extent indicated and rapidly cooling the same as heretofore described, no substantial amounts of sodium chloride were crystallized out of solution, but sizeable quantities of the salts other than the undesired sodium chloride and magnesium chloride contained in the solution were crystallized out. The desired salts further crystallized when the solution was brought to substantially atmospheric temperature and while it was subjected to a vacuum crystallization treatment for between about 2.5 and 3.5 hours. The slurry was then filtered to separate the crystals from this mother liquor, and then the mother liquor containing sodium chloride and magnesium chloride was rejected from the system. The crystals were then ready for use in conjunction with reaction of further quantities of langbeinite and potassium chloride. Three consecutive batch reactions were carried out as above described. The following table discloses the average analysis of the various elements contained in the slurry which was reacted, the figures being in pounds per batch.

TABLE A

*Reaction feeds and compositions for reaction batches*

[Pounds per batch.]

|  | K | Mg | Na | Cl | SO$_4$ | Insol. | H$_2$O | Total |
|---|---|---|---|---|---|---|---|---|
| Langbeinite | 95 | 58 | 2 | 3 | 345 | 7 |  | 510 |
| KCl Solution | 176 |  | 5 | 169 |  |  | 984 | 1,335 |
| Mixed Salts | 134 | 8 | 1 | 110 | 46 |  | 38 | 340 |
| Water |  |  |  |  |  |  | 429 | 429 |
| Total | 405 | 66 | 8 | 282 | 391 | 7 | 1,451 | 2,614 |

The above Table A shows a total of 66 pounds of magnesium and a total of 1451 pounds of water present in the reaction. This amounts to 2.71 mols of magnesium and 80.55 mols of water. To calculate the mols of magnesium per 1000 mols of water, divide 1000 by 80.55 to give the factor 12.44 and multiply 2.71 by this factor, thus obtaining 33.6 mols of magnesium per 1000 mols of water.

The potassium sulfate product recovered averaged per batch about 560 pounds and analyzed about 43.01% potassium, about 0.86% magnesium, about 0.13% sodium, about 2.24% chlorine, about 53.75% sulfate, with the remainder being water and insolubles. This corresponds to a hypothetical salt combination of about 95.8% potassium sulfate, about 0.80% magnesium sulfate, about 2.72% magnesium chloride, about 0.33% sodium chloride, the remainder being water and insolubles. Based upon the potassium content of the langbeinite and muriate of potash originally fed to the reaction zone, the overall recovery of potassium in the final product amounted to about 88.9%.

EXAMPLE 2

This run was carried out in a manner similar to that described in Example 1. Three separate batches were consecutively reacted and the data on the reactants and the reaction product were averaged per batch as described in Example 1. However, the quantities of reactants employed differ per batch. About 1,047 pounds of commercial grade 60% muriate of potash solution, about 451 pounds per batch of langbeinite (commercial), about 602 pounds of tap water per batch and about 366 pounds of mixed salts per batch were employed. The analysis of the elements contained in the reaction mixture or slurry was as follows:

TABLE B

*Reaction feeds and compositions for reaction batches*

[Pounds per batch.]

|  | K | Mg | Na | Cl | SO$_4$ | Insol. | H$_2$O | Total |
|---|---|---|---|---|---|---|---|---|
| Langbeinite | 83 | 52 | 3 | 4 | 307 | 2 |  | 451 |
| KCl Solution | 139 | 2 | 7 | 139 | 4 |  | 757 | 1,048 |
| Mixed Salts | 145 | 7 | 1 | 131 | 31 |  | 51 | 366 |
| Water |  |  |  |  |  |  | 602 | 602 |
| Total | 367 | 61 | 11 | 274 | 342 | 2 | 1,410 | 2,467 |

Similarly, by employing the corresponding figures shown in Table B and employing calculations similar to those following Table A, the total quantities of magnesium and water employed in Example 2 show that about 32.1 mols of magnesium per 1000 pounds of water were present in the reaction mixture.

The evaporation of the potassium sulfate mother liquor and the subsequent vacuum crystallization of the evaporated and concentrated mother liquor were carried out substantially identical with the procedure outlined in Example 1. The potassium sulfate product recovered averaged about 474 pounds per batch and analyzed about 43.44% potassium, about 0.69% magnesium, about 0.05% sodium, about 1.9% chlorine, about 53.64% sulfate, with the remainder being water and insolubles. This corresponds to a hypothetical salt combination of about 96.82% potassium sulfate, about 0.34% magnesium sulfate, about 2.45% magnesium chloride, about 0.13% sodium chloride, with the remainder being water and insolubles. Based upon the potassium content of the langbeinite and muriate of potash originally fed to the reaction zone, the overall recovery of potassium in the final product amounted to about 92.75%.

The variation as between Examples 1 and 2 in the amounts of langbeinite, muriate of potash, mixed salts and water account for the improved purity of the potassium sulfate in Example 2 as compared with that of the potassium sulfate recovered in Example 1.

EXAMPLE 3

The process outlined in Examples 1 and 2 was carried out substantially continuously over a 90 hour period, using the same reactants, mixed salts and tap water as has been described with reference to Examples 1 and 2. The same reaction conditions and the same mechanical agitation were employed, except that in the continuous operation, two reactors arranged in series were employed so that the throughput allowed a retention time of between about 4 and about 4.5 hours with the temperature being maintained at about 45° C. in both reactors. The flow from the last reactor was introduced into a continuous centrifuge where the potassium sulfate pellets and crystals were separated from the mother liquor. The mother liquor was then conducted to an Ozark evaporator at such a rate that it was retained therein, and under the conditions mentioned in Examples 1 and 2, for a sufficient length of time to accomplish between about 39% and about 41% reduction in weight on the same basis outlined in the preceding examples and specification, after which the slurry was quenched to a temperature of about 55° C. as it was being introduced into the first step of the vacuum crystallization. It was retained in the first stage of crystallization on an average of about 1.5 hours and was then introduced into the second stage vacuum crystallization, being quenched to approximately 30° C., where it remained for about an equal length of time. The resultant cooled slurry was then filtered and the mixed salts crystallized therefrom, placed in storage, and introduced into the first reactor, as needed. The feed to the first reaction tank was at the rate of about 215 pounds per hour of commercial grade comminuted langbeinite, about 460 pounds per hour of commercial 60% muriate of potash, aqueous solution (saturated at about 20° C.), about 207 pounds per hour of mixed salts and about 309 pounds per hour of tap water. The composition of the reactants fed to the first reactor contained the following total amounts of the various elements:

TABLE C

*Reaction feeds and compositions for continuous reaction*

[Total pounds over operation period.]

| | K | Mg | Na | Cl | SO₄ | Insol. | H₂O | Total |
|---|---|---|---|---|---|---|---|---|
| Langbeinite | 3,570 | 2,188 | 217 | 376 | 12,974 | 73 | | 19,398 |
| KCl solution | 5,840 | | 134 | 5,501 | | | 29,950 | 41,425 |
| Mixed Salts | 6,214 | 548 | 73 | 5,716 | 2,152 | | 3,953 | 18,656 |
| Water | | | | | | | 27,802 | 27,802 |
| Total | 15,624 | 2,736 | 424 | 11,593 | 15,126 | 73 | 61,705 | 107,281 |

Similarly, by employing the corresponding total magnesium and total water pounds shown in Table C and employing the calculations similar to those immediately following Table A, there is shown to be present in the reaction mixture of Example 3 about 32.8 mols of magnesium per 1000 mols of water.

The potassium sulfate product recovered from the centrifuge amounted to about 22 pounds per hour, dry basis, and analyzed as follows: about 42.33% potassium, about 1.15% magnesium, about 0.07% sodium, about 2.02% chlorine, about 53.89% sulfate, with the remainder being water and insolubles.

This represents a hypothetical salt combination of about 94.34% potassium sulfate, about 2.44% magnesium sulfate, about 2.75% magnesium chloride, about 0.18% sodium chloride with the remainder being water and insolubles. Of the potassium content in the original raw materials, i. e., langbeinite and potassium chloride, about 88.1 weight per cent was recovered as potassium sulfate. Although the data herein shown calculate to a recovery of better than 89%, the true recovery of potassium from the raw materials employed was not that high because of a loss of approximately 188 pounds of potassium in the mixed salts inventory over the 90 hour operating period. This is believed to have been due to the lack of maintenance of a perfect balance of reactants in the first few hours of the 90 hour continuous operation. Nevertheless, upon practicing the operating procedure herein disclosed for continuous operation, the potassium recovery will average about 88% to 89% by weight.

EXAMPLE 4

The continuous process described in Example 3 was carried out using substantially the same amounts of reactants and the same reaction conditions with the exception that four reactors connected in series were employed, and the mixed salts were recycled to the second reactor of the series. The throughput was regulated so as to allow a retention time of between about 4 and 4.5 hours. The temperature in each reactor was maintained at about 45° C.

The potassium sulfate product recovered analyzed as follows: about 43.32% potassium, about 0.70% magnesium, about 0.03% sodium, about 1.76% chlorine, about 53.85% sulfate, with the remainder being water and insolubles.

This represents a hypothetical salt combination of about 96.55% potassium sulfate, about 0.79% magnesium sulfate, about 2.30% magnesium chloride, about 0.03% sodium chloride, with the remainder being water and insolubles.

The percentage of chlorine in the potassium sulfate product is 1.76%. A maximum of 2.5% chlorine has been established by specifications for this product. Changing the point of addition of the mixed salts from the first reactor, as in Example 3, to the second reactor as in Example 4, causes a substantial drop in the chlorine content of the product. The product of Example 3 contained about 2.02% of chlorine. The product resulting from the procedure of Example 3 contained 42.33% potassium, while the product obtained in Example 4 contained 43.32%.

Having thus fully described and illustrated the character of the invention, what is desired to be secured and claimed by Letters Patent is:

1. A process which comprises evaporating a potassium sulfate mother liquor obtained by the separation of potassium sulfate crystals from an aqueous reacted mixture originally comprising essentially langbeinite and potassium chloride and a small but significant amount of sodium chloride just short of the crystallization point of sodium chloride at about room temperature; quickly cooling the evaporated liquor to between about 50° and about 60° C., then to about room temperature, separating mixed salt crystals comprising essentially a major amount of potassium chloride and a minor amount of leonite and kainite therefrom, adding said mixed salts to an aqueous reaction mixture comprising essentially potassium chloride having small but significant amounts of sodium chloride as an impurity and langbeinite having small but significant amounts of sodium chloride as an impurity, reacting said mixture at between about 15° and about 60° C. for a period of time of between about 1 and about 4 hours while agitating the reacting mixture, crystallizing potassium sulfate from the reacted mixture, and separating potassium sulfate therefrom.

2. A process as in claim 1 wherein the evaporated mother liquor is quickly cooled after evaporation and concentration, but prior to separation of the mixed salt crystals.

3. A process as in claim 1 wherein the process is carried out continuously.

4. A process as in claim 1 wherein the reacting mixture is agitated to produce pellets of potassium sulfate and wherein the reaction is carried out continuously.

5. The process of claim 1 wherein the process is carried out continuously using four reaction zones in series and wherein the mixed salts are recycled to a reaction zone intermediate in the series.

6. The process comprising admixing comminuted langbeinite and an aqueous solution of muriate of potash, the admixture containing small amounts of sodium chloride as an impurity for over a period of about one hour at a temperature of about 30° C., adding to the reacting mixture mixed salts comprising essentially about 75 weight per cent potassium chloride and about 25 weight per cent leonite and kainite, said mixed salts being obtained by evaporating the mother liquor of the desired potassium sulfate product just short of the crystallization point of sodium chloride at about room temperature, agitating the aqueous admixture of mixed salts and the aforesaid reacting mixture for above two hours at about 45° C., and separating potassium sulfate crystals from the reacted mixture.

7. The process which comprises continuously evaporating a potassium sulfate mother liquor, obtained from the formation and separation of potassium sulfate crystals from an aqueous reacted mixture originally comprising essentially langbeinite and potassium chloride and small but significant amounts of sodium chloride, just short of the crystallization point of sodium chloride at about room temperature; continuously quickly cooling the evaporated mother liquor to between about 50° and about 60° C., followed by cooling to about room temperature and continuously separating mixed salt crystals comprising essentially a major amount of potassium chloride and a minor amount of leonite and kainite therefrom, continuously adding said mixed salts to an aqueous reaction mixture to which is continuously added comminuted langbeinite and muriate of potash at such a rate of throughput as to allow between about 4 and about 4.5 hours of reaction time at a temperature of about 45° C. and continuously separating the potassium sulfate crystals from the reacted mixture.

8. The process of claim 6 wherein the process is carried out continuously and wherein the reaction zone comprises four reaction zones in series, the mixed salts being added to the second reaction zone in the series.

9. A process which comprises initiating the reaction between langbeinite and potassium chloride in an aqueous medium, said reaction mixture containing a small but significant amount of sodium chloride as an impurity, adding to the resulting mixture, after initiation of the reaction, but before completion of the reaction, mixed salts substantially free of sodium chloride and comprising essentially a major amount of potassium chloride and a minor amount of leonite and kainite in such amount that the resulting reaction mixture contains between about 32.0 moles and about 33.5 moles of magnesium per 1000 moles of water present, allowing the reaction to proceed to substantial completion, and separating potassium sulfate crystals from the reacted mixture.

10. A process which comprises reacting langbeinite, containing a small but significant amount of sodium chloride as an impurity, with potassium chloride, containing a small but significant amount of sodium chloride as an impurity, in an aqueous medium, separating the resulting potassium sulfate from the reaction products, concentrating the resultant mother liquor to a concentration, such that upon cooling to about atmospheric temperature, it is just short of the crystallization point of sodium chloride, cooling said liquor to crystallize mixed salts comprising essentially a major portion of potassium chloride and a minor portion of leonite and kainite, and returning a sufficient amount of said mixed salts to the potassium chloride-langbeinite reaction mixture prior to completion of the reaction, so that the resulting reaction mixture will contain between about 32.0 moles and about 33.5 moles of magnesium per 1000 moles of water present.

11. The process of claim 10, wherein the langbeinite-potassium chloride reaction is carried out in at least two reaction zones in series, the langbeinite and potassium chloride being added to the first reaction zone and the mixed salts being added to a reaction zone other than the first reaction zone.

12. The process of claim 10, wherein the langbeinite-potassium chloride reaction is carried out in between three and six reaction zones in series, and the mixed salts are added to a reaction zone intermediate in the series.

References Cited in the file of this patent

UNITED STATES PATENTS

| Number | Name | Date |
|---|---|---|
| 2,295,257 | Butt et al. | Sept. 8, 1942 |
| 2,437,182 | Barr et al. | Mar. 2, 1948 |
| 2,561,055 | Hood | July 17, 1951 |

FOREIGN PATENTS

| Number | Country | Date |
|---|---|---|
| 313,053 | Germany | June 13, 1919 |